United States Patent [19]
Jost

[11] Patent Number: 6,035,728
[45] Date of Patent: Mar. 14, 2000

[54] TEST RIG

[75] Inventor: Stefan Jost, Eppstein-Bremthal, Germany

[73] Assignee: Breed Automotive Technology, Inc., Lakeland, Fla.

[21] Appl. No.: 09/000,486

[22] PCT Filed: Jun. 2, 1997

[86] PCT No.: PCT/GB97/01488

§ 371 Date: Jan. 30, 1998

§ 102(e) Date: Jan. 30, 1998

[87] PCT Pub. No.: WO97/46859

PCT Pub. Date: Dec. 11, 1997

[30] Foreign Application Priority Data

Jun. 3, 1996 [GB] United Kingdom .................... 9611557
Nov. 18, 1996 [GB] United Kingdom .................... 9623933

[51] Int. Cl.[7] .................................................. G01M 17/00
[52] U.S. Cl. ....................... 73/865.3; 73/12.01; 73/866.4
[58] Field of Search ............................. 73/865.3, 12.01, 73/865.9, 866.4

[56] References Cited

U.S. PATENT DOCUMENTS 5,373,749  12/1994  Strand et al. .......................... 73/865.3
5,635,624   6/1997  Cerny ................................. 73/865.3 X
5,641,917   6/1997  Hurite ................................... 73/865.3

FOREIGN PATENT DOCUMENTS 660097  6/1995  European Pat. Off. .
4407256 9/1994  Germany .

Primary Examiner—Thomas P. Noland
Attorney, Agent, or Firm—Markell Seitzman

[57] ABSTRACT

A test rig for impact testing on vehicles comprises a platform for mounting a vehicle seat and test dummy and an array of individually selectively controllable actuators, in close proximity to the platform. The actuators are extendible towards the platform by individually determinable velocities. Control loops and microprocessors assist the control. In this way a more accurate and versatile simulation is possible of any one of a variety of crash situations including pole impacts. Vehicle characteristics can be simulated without the need to use expensive actual vehicle parts.

11 Claims, 7 Drawing Sheets

SIDE VIEW

4

TOP VIEW

4

TEST RIG

BACKGROUND AND SUMMARY OF THE INVENTION

The present invention relates to a test rig and particularly to testing apparatus for simulating the dynamic characteristics of a vehicle crash in a laboratory situation, for testing safety restraint apparatus.

Traditionally test rigs comprise dynamic sleds mounted on tracks for rapid acceleration. For practical reasons safety restraint testing is done under conditions of acceleration rather than deceleration.

However, traditional reverse acceleration dynamic test rigs are extremely expensive and space consuming and do not accurately simulate the conditions prevalent from transverse components of crash forces such as occur in side impacts.

In particular it is difficult in known test rigs accurately to reproduce the deployment gap due to the intrusion of a vehicle the door and B-pillar in a lateral impact and therefore difficult to correlate the contact times of the vehicle occupant with the door and B-pillar sills or trims. In addition, different vehicles have door and B-pillar arrangements with different characteristics and the three dimensional nature of the side impact velocity profile will shape the sills and the force will be transferred in different degrees to different sections. Hence accurate representation of the acceleration and velocity profiles for different sections of different vehicles is virtually impossible with known test rigs.

Accurate side impact test results have only hitherto been achieved by using virtually a complete vehicle body coated with a honeycomb foam barrier. Such a test is prohibitively expensive since a new body and new foam barrier is required for each test.

It is an object of the present invention to provide a relatively inexpensive re-usable and compact test rig capable of accurately simulating a wider range of side impact crash velocity profiles and pulses and of a variety of intrusion profiles, than hitherto possible.

The invention also aims to provide for pole testing, i.e. to simulate the conditions of impact with a single object such as a tree. This has not otherwise been possible with known dynamic sled arrangements.

According to the present invention there is provided a test rig for impact testing on vehicles,
the rig comprising:
a mounting platform
means for securing an item, or arrangement to be tested, to the platform,
an array of actuators mounted in close proximity to the mounting platform,
means for selectively extending any one or more or any combination of the actuators in a direction towards the mounting platform,
wherein the holding means is adjustable to enable the test item or arrangement to be mounted at any one of a plurality of positions relative to the array of actuators.

Preferably there is provided means for controlling the extension and the acceleration of each actuator, in accordance with predetermined crash and vehicle profile characteristics, and means for recording the reaction forces on each actuator.

According to a preferred embodiment removable shaped padding is fixed to the actuator array.

For a better understanding of the present invention and to show how the same may be carried into effect, reference will now be made to the accompanying drawings in which:

DETAILED DESCRIPTION OF THE DRAWINGS

Figure 1:
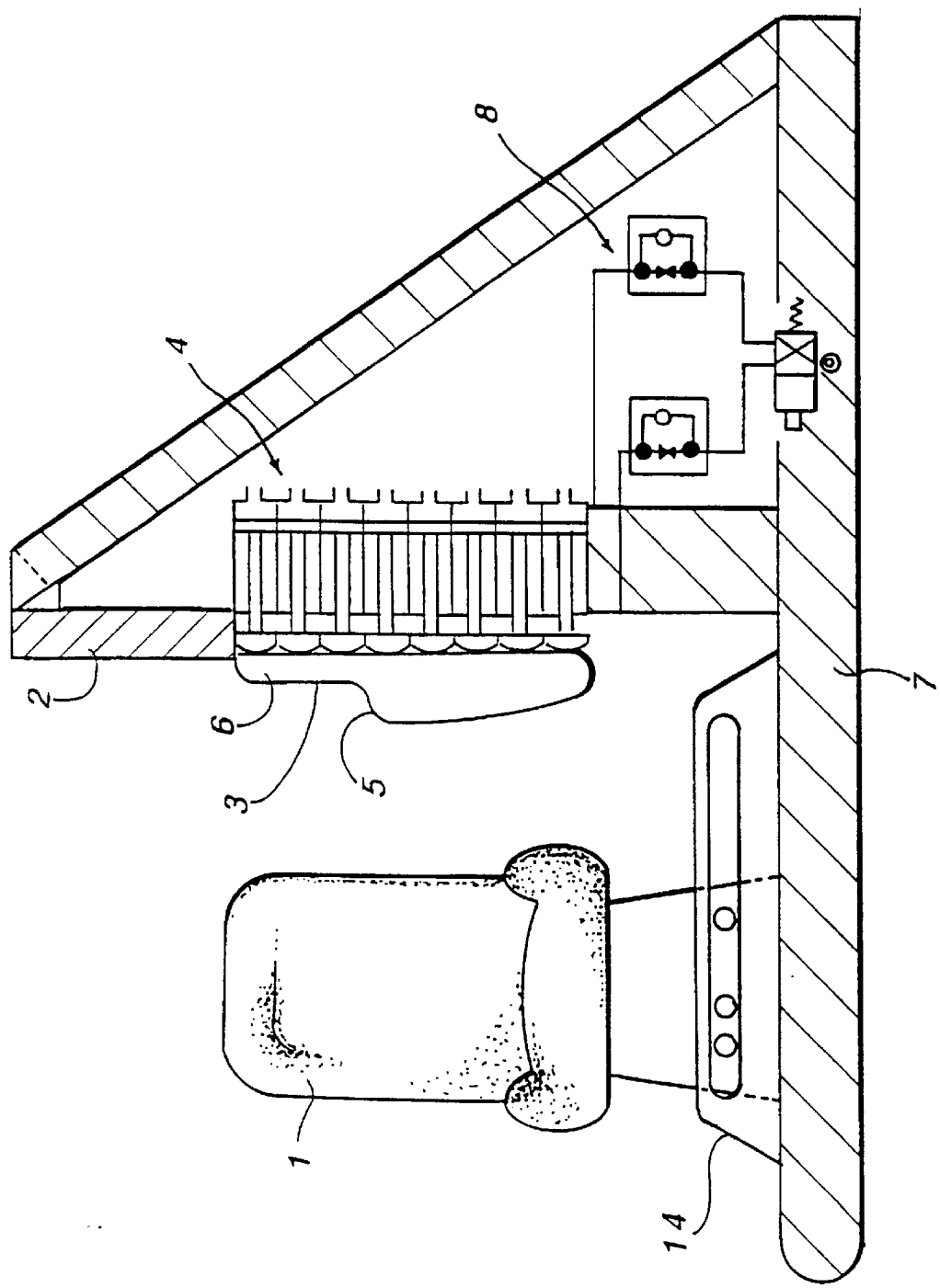
FIG. 1 is a part cross-sectional, part schematic view of a test rig according to the invention.

FIG. 1 shows an automotive seat 1, a test buck 7, and an actuator arrangement 4, showing the location of each part in relation to the others. The test buck is made of rigid metal bars holding the seat 1 on a sliding fixture 14 and comprises a simulated door/b-pillar arrangement with the actuators 4.

The actuators 14 are covered with padding 6 which may be of foam or other resilient material and which is shaped to simulate the internal upholstery of a vehicle door. In the example shown in FIG. 1 this shaping includes arm rest 5 and door trim 3. This padding 6 is removable and interchangeable so that different characteristics of shape and resiliency can be simulated to reflect the internal upholstery of different vehicles. The area of the test buck above the padding 6 and actuators 4 represents the usual position of a window in a real vehicle. This is indicated at 2 in the figure.

This is the set-up used for the test examples described below.

Example 1

The test buck 7 is placed on a HyGe reverse accelerator rail and the actuator 14 set up is used as a stiff elongation of the simulated vehicle door/b-pillar arrangement and simulates the correct time varying intrusion which would occur during a real side impact at the inner vehicle sills.

Example 2

As in Example 1 the test buck is placed on a HyGe reverse accelerator rail, the actuator 14 set up is used as a stiff elongation of the simulated door/b-pillar arrangement and simulates the correct time varying intrusion which would occur during a real side impact at the inner vehicle sills. However in addition the actuators 14 are programmed and designed to create additional damping characteristics to different locations of the door/b-pillar arrangement in order to simulate velocity profiles more representative of real vehicle side impact crashes.

Example 3

The test buck 7 is used as a stand alone unit without a reverse accelerator tool. Therefore stronger actuators 14 are used to simulate the complete scenario of a side impact sequence. In detail they are programmed to apply the correct acceleration to the occupant by the distance over time and have an accurate stiffness to achieve representative response during the event from a crash dummy installed on the seat 1.

The actuator arrangement 4 comprises an array of individually controlled actuators. Control may be by electrical or pneumatic or hydraulic signals and each actuator is provided with a control loop 8 (only one of which is shown). A microprocessor or other computer means is connected to the control loops of the actuators to control supply of the desired actuator control signals in accordance with data fed into the computer/microprocessor and with calculations effected by the microprocessor taking into account the desired displacement profile, appropriate damping characteristics and the necessary intrusion profile at different locations and for different velocities. Suitably between 10 and 80 actuators are used in an array simulating the shape of a vehicle door.

Figure 2:
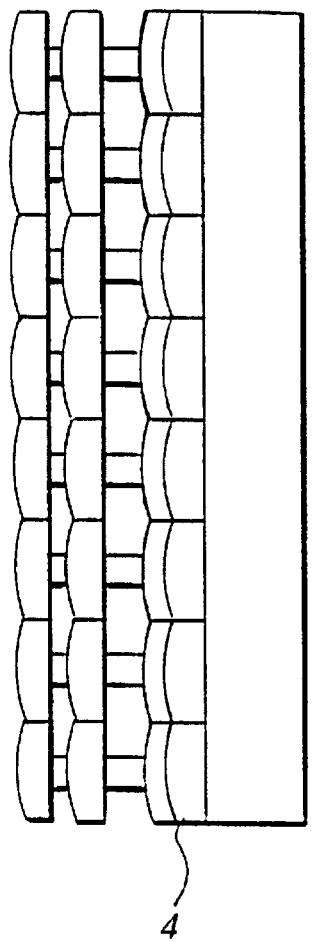
FIGS. 2a and 2b are cross sectional side and top views respectively of the actuators of FIG. 1.
Figure 2:
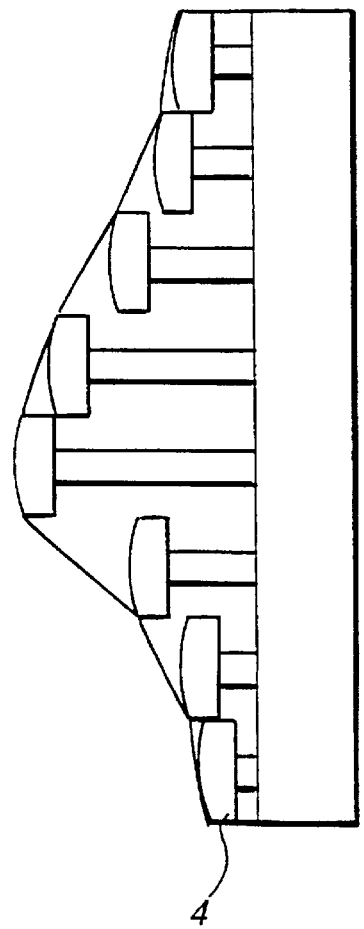

FIGS. 2a and 2b illustrate a side and a top view respectively of actuators 4 representing a door profile at the end of a simulated incident for a pole impact to the side of a vehicle. A pole impact is an impact with a single object such as a telegraph pole or tree trunk. Previously there was no system available which could reproduce such an intrusion over time. Previous procedures used an existing door structure and bent it to the correct shape for the test. However this represents only one stage of the event, whereas in the present invention the actuators move during the crash event and will therefore simulate the desired intrusion at each point of time.

The pole impact with its profile is only one example of events where the actuator matrix gives a major advantage over existing test concepts.

Figure 3:
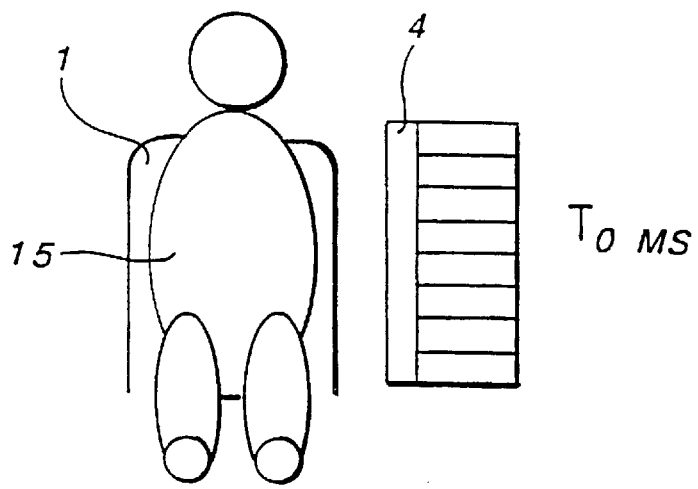
FIGS. 3a, 3b, 3c are side views illustrating a sequence in the operation of the actuators of FIG. 1.
Figure 3:
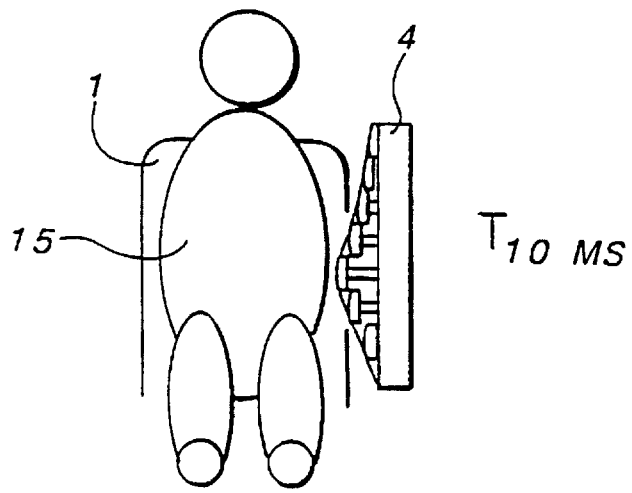
Figure 3:
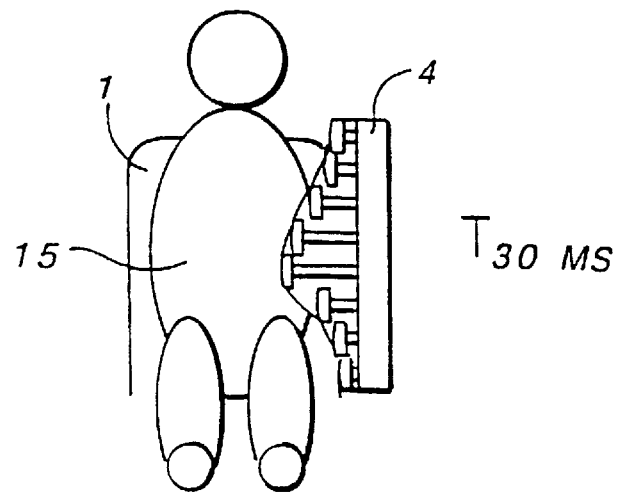

FIGS. 3a, 3b, 3c illustrate side views of the door/b-pillar and seat/occupant arrangement during the first 30 ms of a side impact event simulated on the test rig.

In FIG. 3a the situation at T0 i.e. before the crash occurs is shown, with the actuators 4 all being in one simulating as undisturbed door/b-pillar.

A passenger/crash dummy 15 is seated on the seat 1 with a gap separating the passenger from the door.

In FIG. 3b the situation 10 ms ($T_{10}$) into the side impact crush is shown. The actuators have been activated to different degrees to simulate the real life response expected (or determined from experiments) of a vehicle door and b-pillar panel. In this case the actuators in the middle of the region are moved further than those towards the top and bottom of the door, giving a curved profile intruding into the gap which previously separated the passenger and the door.

In FIG. 3c, the actuator profile is more exaggerated and represents the situation at $T_{30}$ (30 ms into the crash).

In this case no movement of the vehicle seat 1 is effected, the crash is simulated only by the actuator profile and movement. This has considerable advantages in cost and in the space required for the test rig. However a combination of seat movement e.g. effected by a reverse accelerator HyGe sled and the actuators can alternatively be used and will in many cases achieve more realistic correlation. However the cost savings will still be achieved since there is no need to use the expensive prototype vehicle body parts which were previously needed to achieve similar correlations.

It can easily be seen that the actuator control can be adapted in speed, strength and extent of intrusion to simulate different crash pulses and for different door and b-pillar responses.

Existing test set-ups cannot reproduce different velocity profiles over the door-b-pillar surface since there is only one pulse (of the single reverse accelerator) applied. The invention enables this pulse to be changed for different sections of the door surface and allows the introduction of controlled damping characteristics via the actuator matrix 4.

Figure 4:
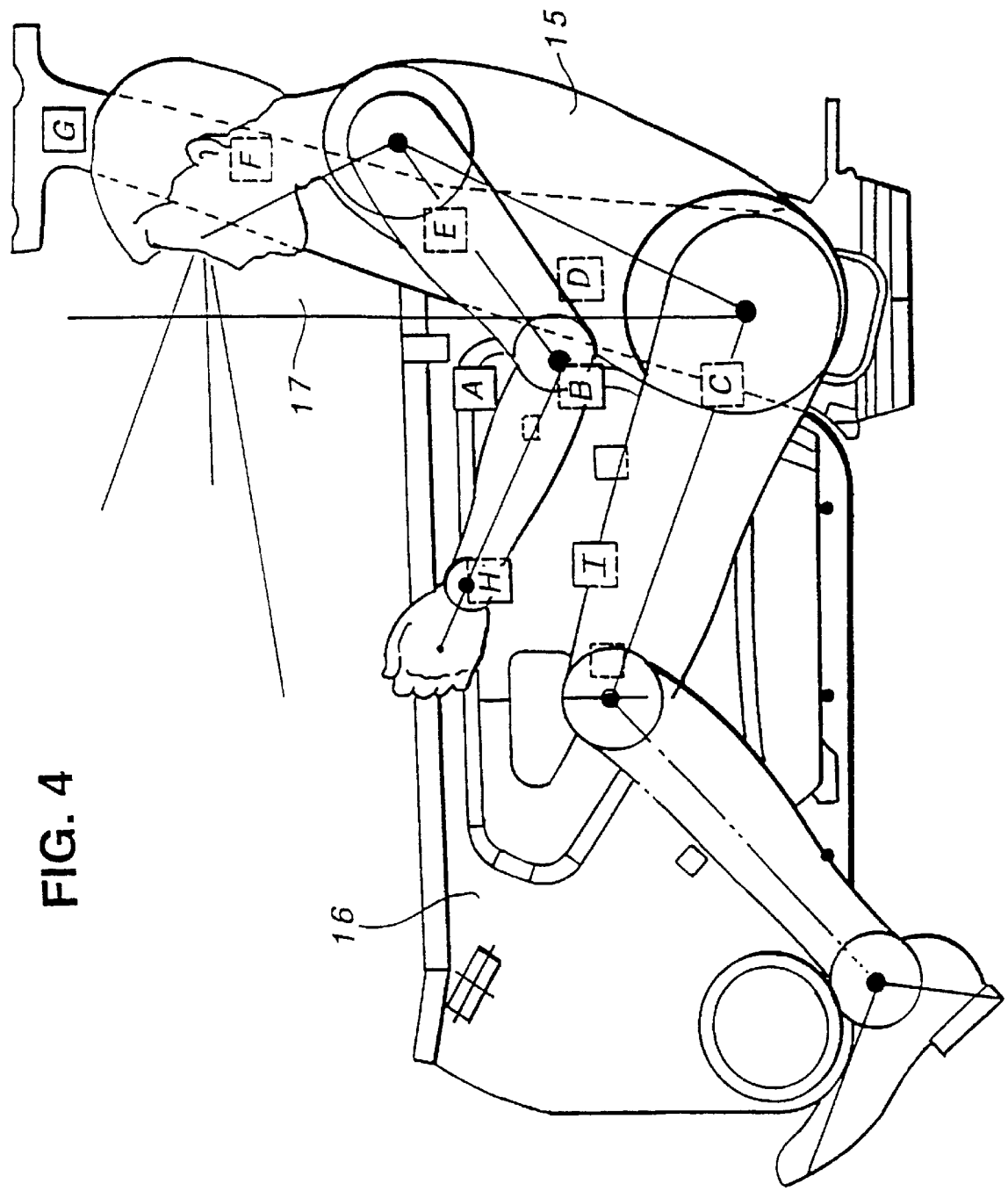
FIG. 4 is a side view of a crash dummy in a test rig according to the invention.

FIG. 4 illustrates in more detail, a crash dummy 15 used in safety restraint test rigs. The dummy 15 is shown seated in a driving position with feet in a raised orientation for contacting the floor pedals (not shown) The hands are raised for holding the steering wheel (not shown).

The position of a door 16 and a b-pillar 17 are shown behind the dummy 15. The dummy 15 is equipped with sensors A to I at the following locations to detect the severity of the effects of an impact on different parts of the body.

A: upper door at middle rib

B: middle door at lower rib

C: lower door at high point

D: tube middle B-pillar between lower and middle rib

E: middle B-pillar at upper rib

F: D-ring B-pillar

G: roof B-pillar

H: 1 upper door+250 mm

I: 2 middle door+250 mm

Figure 5:
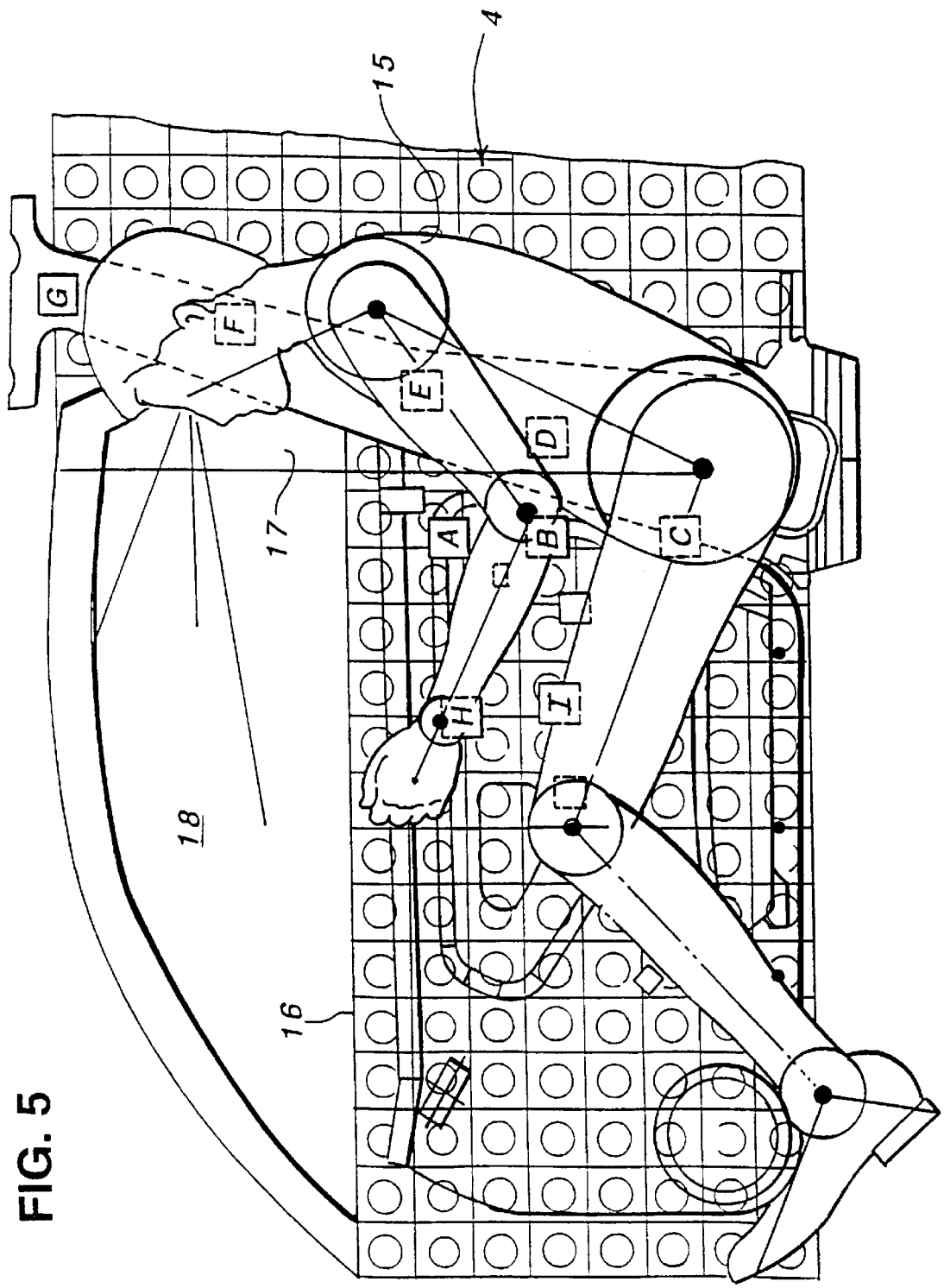
FIG. 5 is the same view as FIG. 4 overlaid on an actuator array.

FIG. 5 shows the crash dummy 15 of FIG. 4 overlaid on the actuator matrix array 4 which covers an area corresponding to the door 16 and b-pillar 17 of the side of an automobile. The area corresponding to the window is shown at 18 and is not covered by actuators.

FIGS. 6 to 9 illustrate different possibilities for test rigs.

Figure 6:
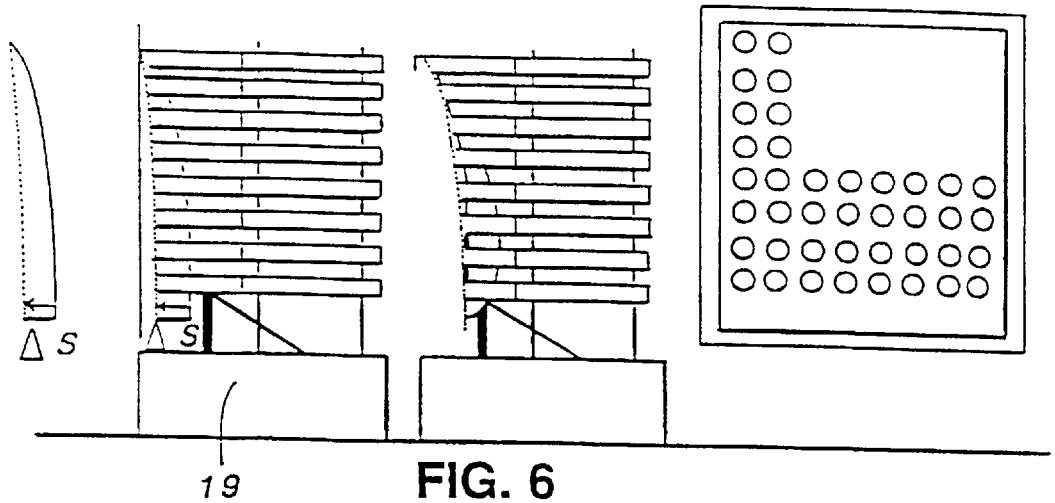
FIGS. 6, 7, 8 and 9 show side views of alternative arrangements of test rig according to the invention.

FIG. 6 shows a quasi-static test rig assembly using one way acceleration.

This test rig has a hard standing testing assembly 19 in which the only moving parts are the crash dummy, the seat and the actuator pistons. Due to the small number of moving parts the acceleration forces required are relatively small yet the arrangement gives an accurate reproduction of the behaviour of the crash dummy. In this embodiment there is neither sled nor hydro ram.

Figure 7:
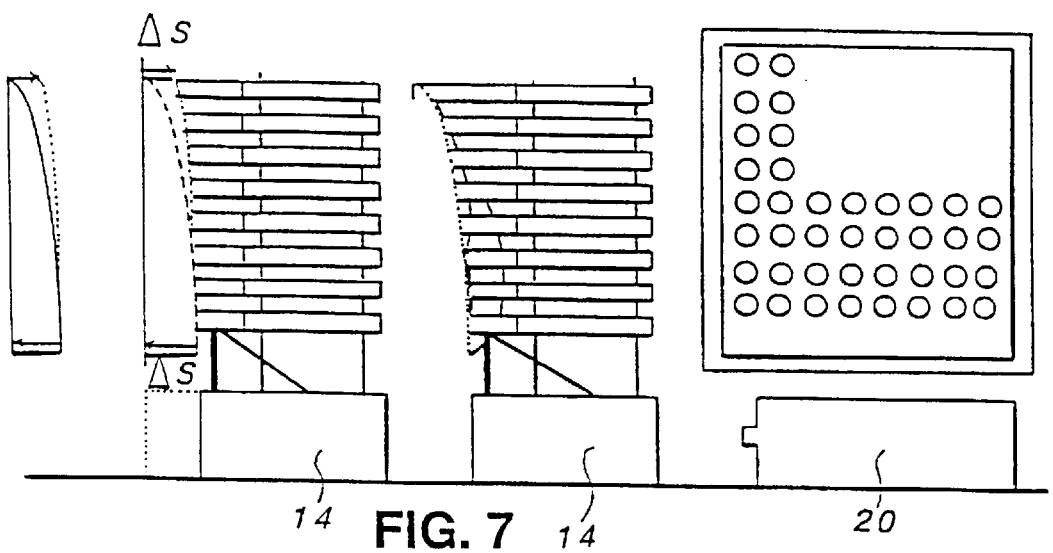

FIG. 7 illustrates a test rig arrangement using a hydraulic cylinder acting against the direction of the sled. This works on the principle of subtracting acceleration vectors to combine two movements. It combines the speed and deformation profiles of a full scale crash test into a simpler model by using only the structural side part with door and B-pillar. The sled is shown at 14 and the hydro pulsar ram at 20.

Figure 8:
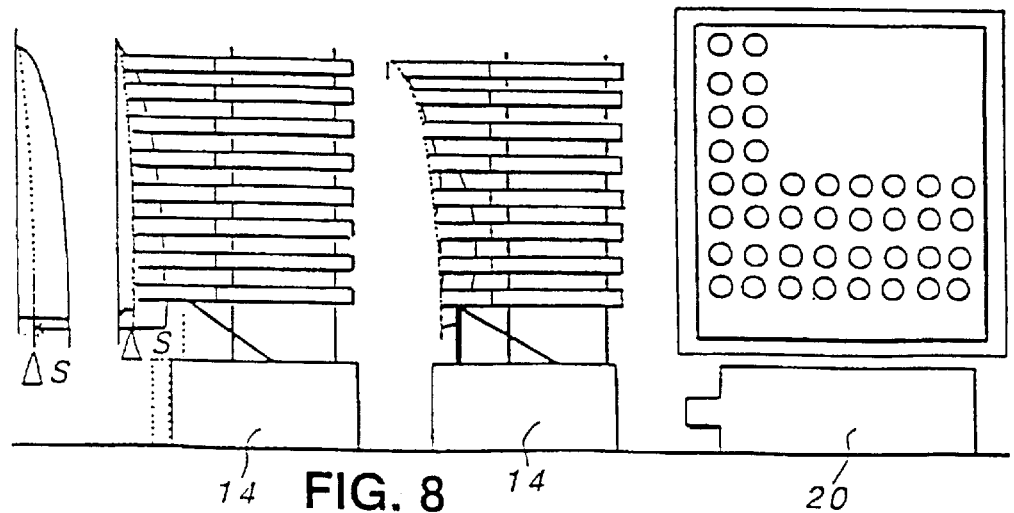

In FIG. 8 the speed combinations are effectively achieved by the addition of acceleration vectors with the hydraulic cylinder acting in the same direction as the sled 14.

Figure 9:
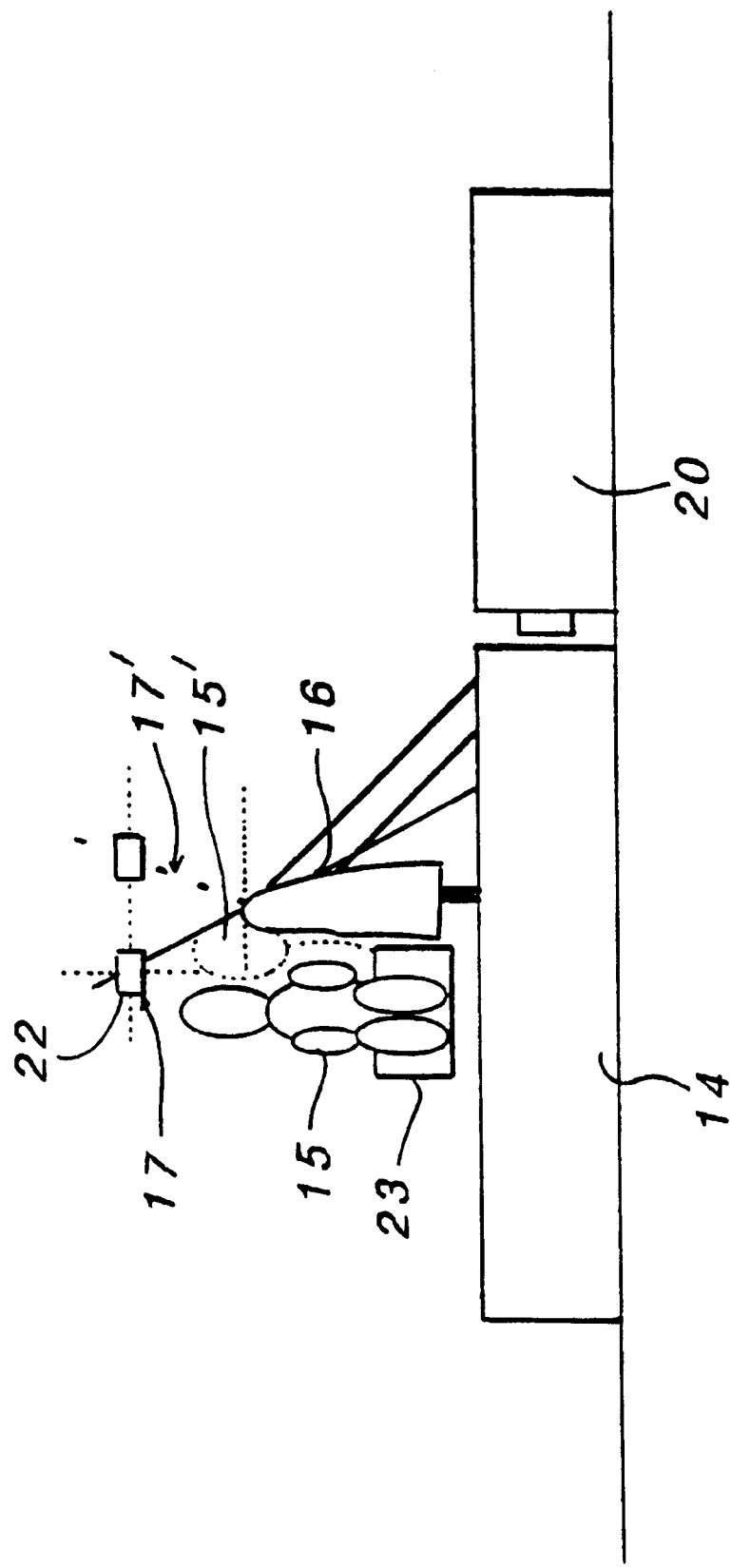

FIG. 9 illustrates a test rig arrangement using a side structure and a moving B-column. The door structure 16 is pre-deformed and a moving B-pillar 17 is used as an approximate model. The driving unit is a HyGe sled 14. A mass 22 is fixed to the B-pillar 17 in such a way that its height on the B-pillar can be adjusted so that the centre of gravity of the B-pillar 17 with the mass 22 corresponds to the level of the true contact point of the roof structure and the B-column. In the event of side collisions the inside of the vehicle at this point should suffer virtually no deformation.

The crash dummy 15 is positioned on a seat 23 which is attached to a second cradle.

During the simulated crash impact the centres of gravity of the seat 23 with the dummy 15 and the B-pillar 17 do not change relative to the door structure 16 which moves directly.

The mass of the moving components causes relative movement between the dummy 15, the seat 23, the door 16 and the B-pillar so as to closely approximate to a real crash situation.

There are further possibilities for constructing a test rig according to the invention, within the capabilities of a person skilled in the field. For example, the door structure may be accelerated without the sled system.

What is claimed is:

1. A test rig for impact testing of vehicle components, the rig comprising:

a mounting platform, means for securing an item, or arrangement to be tested, to the platform, an array of actuators mounted in close proximity to the mounting platform, means for selectively extending any combination of the actuators in a direction towards the mounting platform, wherein the securing means is adjustable to enable the test item or arrangement to be mounted at any one of a plurality of positions relative to the array of actuators.

2. A test rig according to claim 1 further comprising means for individually and selectively controlling the extension and the acceleration of each actuator in the array in accordance with predetermined crash and vehicle profile characteristics.

3. A test rig according to claim 2 wherein the control means includes means capable of being programmed with damping characteristics for at least a portion of the array.

4. A test rig according to claim 2 further comprising means for recording the reaction forces on each actuator.

5. A test rig according to claim 1 further comprising means for recording the reaction forces on each actuator.

6. A test rig according to claim 1 wherein removable padding is attached to at least a portion of the actuator array to simulate internal vehicle upholstery.

7. A test rig according to claim 1 including a reverse accelerator vehicle test sled.

8. A test rig according to claim 1 wherein control is effected by electrical, pneumatic or hydraulic signals.

9. A test rig according to claim 1 wherein each control means comprises a feedback control loop.

10. A test rig according to claim 9 further comprising microprocessor means connected to the control loops of the actuators to control supply of the desired actuator control signals.

11. A test rig according to claim 10 wherein the control signals are generated for each test and for a particular vehicle, as a function of desired displacement profile, predetermined damping characteristics of the vehicle side material, and required intrusion profiles at different locations on the vehicle side and for different vehicle velocities.

* * * * *